US006479158B1

(12) United States Patent
Kuntz et al.

(10) Patent No.: US 6,479,158 B1
(45) Date of Patent: Nov. 12, 2002

(54) FUSER MEMBER WITH AN AMINO SILANE ADHESIVE LAYER AND PREPARATION THEREOF

(75) Inventors: Alan R. Kuntz, Webster, NY (US); Frank P. Sgabellone, Macedon, NY (US); David E. Maxfield, Jr., Rochester, NY (US); Anthony J. Formicola, Jr., Webster, NY (US); Robert N. Finsterwalder, Webster, NY (US); David M. Friel, Webster, NY (US)

(73) Assignee: Xerox Corporation, Stamford, CT (US)

(*) Notice: Subject to any disclaimer, the term of this patent is extended or adjusted under 35 U.S.C. 154(b) by 858 days.

(21) Appl. No.: 08/824,576

(22) Filed: Mar. 26, 1997

(51) Int. Cl.$^7$ .................................................. B32B 9/04

(52) U.S. Cl. ....................... 428/447; 428/448; 428/450; 492/56; 399/333

(58) Field of Search ................................ 428/447, 448, 428/450; 492/56; 399/320, 333

(56) References Cited

U.S. PATENT DOCUMENTS

| | | | |
|---|---|---|---|
| 4,323,603 A | 4/1982 | Close | 524/545 |
| 4,400,482 A | 8/1983 | Close | 524/114 |
| 5,049,444 A | 9/1991 | Bingham et al. | 428/339 |
| 5,219,612 A | 6/1993 | Bingham et al. | 427/194 |
| 5,279,861 A | 1/1994 | Shigeta | 427/402 |
| 5,332,641 A | 7/1994 | Finn et al. | 430/124 |
| 5,501,881 A | 3/1996 | Fuller et al. | 427/421 |

FOREIGN PATENT DOCUMENTS

| | | | |
|---|---|---|---|
| EP | 577014 B1 | | 1/1997 |
| EP | 0 815 949 A1 | | 7/1998 |
| JP | HEI 7-178367 | * | 7/1995 |

OTHER PUBLICATIONS

Xerox Disclosure Journal—vol. 18, No. 3, May/Jun. 1993 entitled "Improved Viton to Silicone Rubber Adhesion", p 253.

Xerox Disclosure Journal—vol. 21, No. 2, Mar./Apr. 1996 entitled "Flow Coating Fixture", pp 185–186.

* cited by examiner

*Primary Examiner*—Mark A. Chapman
(74) *Attorney, Agent, or Firm*—Annette L. Bade

(57) ABSTRACT

A fuser member having an amino silane adhesive layer intermediate a fuser substrate and an outer fluoroelastomer layer wherein the amino silane adhesive layer contains an amino silane composition and an organo phosphonium catalyst, along with an image forming apparatus using such fuser member and a method for preparation of the fuser member using a flow coating method are disclosed.

32 Claims, 3 Drawing Sheets

FUSER MEMBER WITH AN AMINO SILANE ADHESIVE LAYER AND PREPARATION THEREOF

CROSS REFERENCE TO RELATED APPLICATIONS

Attention is directed to the following copending applications assigned to the assignee of the present application: U.S. application Ser. No. 08/669,761 filed Jun. 26, 1996, entitled, "LEVELING BLADE FOR FLOW COATING PROCESS FOR MANUFACTURE OF POLYMERIC PRINTER ROLL AND BELT COMPONENTS;" U.S. application Ser. No. 08/672,493 filed Jun. 26, 1996, entitled, "FLOW COATING PROCESS FOR MANUFACTURE OF POLYMERIC PRINTER ROLL AND BELT COMPONENTS;" and U.S. application Ser. No. 08/822,521 filed Mar. 24, 1997 entitled "FLOW COATING SOLUTION AND FUSER MEMBER LAYERS PREPARED THEREWITH." The disclosures of these applications are hereby incorporated by reference in their entirety.

BACKGROUND OF THE INVENTION

The present invention relates to a fuser member and method for fusing toner images in an electrostatographic reproducing apparatus. The present invention further relates to a method for preparation of such a fuser member. More specifically, the present invention relates to methods and apparatuses directed towards fusing toner images using a fuser member having an amino silane adhesive layer and an outer fluoroelastomer layer, and methods for the preparation of such fuser members.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat may be applied by heating one or both of the rolls, plate members, or belt members. The fusing of the toner particles takes place when the proper combination of heat, pressure and contact time are provided. The balancing of these parameters to enable the fusing of the toner particles is well known in the art, and can be adjusted to suit particular machines or process conditions.

It is important in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser, and accordingly it is desired to provide a fusing surface which has a low surface energy to provide the necessary release. To ensure and maintain good release properties of the fuser, it has become customary to apply release agents to the fuser roll during the fusing operation. Typically, these materials are applied as thin films of, for example, silicone oils to prevent toner offset.

The process for the preparation of such fuser members is important in maintaining desired fuser life. Further, the composition of the layers, including the adhesive layer, are important in providing sufficient fuser life and prevention of toner offset. In particular, the bond between the fuser substrate and the outer surface must be sufficient in order to prevent the outer surface of the fuser member from debonding, resulting in fuser failure. The bond between the surface of the fuser member and the outer layer degrades as a function of time at the elevated temperatures involved in the fusing process which may exceed 400° F. Known adhesives such as the THIXON® epoxy adhesive (THIXON® is a trademark of Dayton Chemical Products Laboratories) degrade to the point where they no longer function as an adhesive and failure is experienced with wholescale debonding of the fusing layer from the fuser substrate, such that the fusing surface may be manually peeled from the substrate.

Known epoxy adhesives further require baking for solidification. This baking step is an additional timely and costly step in the manufacture of fuser members.

It is also important that the adhesive react sufficiently with the substrate and the outer layer so as to provide an even coat and to provide sufficient bonding of the outer layer. Known adhesives have been shown to form clumps and uneven coating of the fuser substrate.

Another important feature of the adhesive is that it should be compatible for use with processes for preparing fuser rolls. Known processes for providing surfaces of fuser members include two typical methods which are dipping of the substrate into a bath of coating solution or spraying the periphery of the substrate with the coating material. However, recently, a process has been developed which involves dripping material spirally over a horizontally rotating cylinder. Generally, in this new flow coating method, the coating is applied to the substrate by rotating the substrate in a horizontal position about a longitudinal axis and applying the coating from an applicator to the substrate in a spiral pattern in a controlled amount so that substantially all the coating that exits the applicator adheres to the substrate. For specific details of an embodiment of the flow coating method, attention is directed to commonly assigned, U.S. application Ser. No. 08/672,493 filed Jun. 26, 1996, entitled, "FLOW COATING PROCESS FOR MANUFACTURE OF POLYMERIC PRINTER ROLL AND BELT COMPONENTS," the disclosure of which is hereby incorporated by reference in its entirety.

However, not all coatings and adhesives are compatible with the new flow coating method. Specifically, only materials which can be completely dissolved in a solvent can be flow coated. Further, it is desirable that the coating material have the ability to remain dissolved during the entire flow coating process which may take up to approximately 8 hours or longer, and remain dissolved during the manufacturing period which may take up to several days, for example about 1 to 5 days. Satisfactory results are not obtained with materials which tend to coagulate or crystallize within the time period required for flow coating. It is desirable to use a material capable of being flow coated for an increased amount of time to enable flow coating in a manufacturing and production environment. It is very costly to periodically shut down a manufacturing line and change the solution delivery system. If the adhesive does not have the desired properties, the assembly line may need to be shut down often, for example, every hour or every few hours in order to clean the delivery line of coagulated or crystallized material. Therefore, it is desirable to use a material which has good flow coating properties in order to allow for manufacturing to continue for a long period of time, for example several days, without occurring the above problems in the procedure.

It is also desirable that the adhesive be slow drying to avoid trapping solvent in the under layers which tends to cause bubbles and solvent "pops." Bubbles result from trapped air in the coating which results in non-uniformity of coating and or surface defects. Solvent "pops" are defined as trapped air or solvent voids that rupture resulting in crater-like structures causing non-uniform coated areas or surface defects. In either case, these defects can act as initiation sites for adhesion failures.

In addition, good results are not obtained with materials which are not reactive with solvent coatings.

Moreover, useful materials for the flow coating process should possess the ability to flow in a manner which allows for the entire roll to be coated. Therefore, it is desirable that the material possess a desired viscosity which allows it to flow over the entire surface of the member being coated. Along with these properties, it is desirable that the material to be coated possess a balance between viscosity and percent solids to enable sufficient build rates which impact throughput and work in process. Build rates are defined as the thickness of a material that can be coated per unit time. The thickness of the material should allow for a balance between maintaining thickness uniformity and avoiding solvent "pops" and air bubbles. Throughput in the process is the number of units that are processed per unit time. Work in process (WIP) is the number of units currently in any one of the process stages from beginning to end. The objective is to maximize the build rate and reduce the throughput time and work in process.

Also, although not a necessary feature of materials useful in the flow coating procedure, it is desirable that the material not require baking for solidification. The baking step is costly and time consuming. The elimination of the baking step provides a time savings for the manufacture and a cost savings to the customer.

Many materials known to be useful for outer coatings of a fuser member, such as, for example, fluoroelastomers, possess the above qualities necessary for flow coating. However, most known adhesives do not possess the above qualities and many problems are associated with the flow coating of adhesives.

Particularly, well-known adhesives such as epoxy resins and the like cannot be flow coated because epoxy resins do not possess many of the above qualities. In addition, epoxy resins require baking before coating an outer layer thereon. Similarly, many known amino silane adhesives have a short pot life and a reduced life. Therefore, such adhesives cannot be successfully flow coated.

U.S. Pat. No. 5,332,641 to Finn et al., the disclosure of which is hereby incorporated by reference in its entirety, discloses a fuser member having an amino silane cured fluoroelastomer adhesive layer and thereon, an outer elastomer fusing surface.

U.S. Pat. No. 5,049,444 to Bingham et al., the disclosure of which is hereby incorporated by reference in its entirety, discloses a multilayered fuser member having in sequential order a base support member, an adhesive layer comprising a fluoropolymer and a silane coupling agent, a tie coat layer, and an outer elastomeric layer comprising a metal oxide filled fluoropolymer.

U.S. Pat. No. 5,219,612 to Bingham et al., the disclosure of which is hereby incorporated by reference in its entirety, teaches a method of using a multilayered fuser member having in sequential order a base support member, an adhesive layer comprising a fluoropolymer and a silane coupling agent, a tie coat layer, and an outer elastomeric fusing surface.

There exists a need for an adhesive which provides adequate bonding of the outer layer to the fuser member substrate, reacts sufficiently with the outer layer to provide even coating of the outer layer, and can be used with new flow coating procedures of preparation of fuser members. The qualities necessary for sufficient flow coating include providing slow solidification following flow coating, possessing the ability to substantially dissolve in a solvent and remain dissolved throughout the flow coating and manufacturing procedures, being non-reactive with solvents, and providing a sufficient balance between flowability, viscosity and percentage solids.

SUMMARY OF THE INVENTION

Examples of objects of the present invention include:

It is an object of the present invention to provide methods and apparatuses with many of the advantages indicated herein.

It is another object of the present invention to provide an adhesive which sufficiently bonds the outer surface of a fuser member to the fuser member substrate.

A further object of the present invention is to provide an adhesive which coats evenly when coated on a fuser substrate.

Another object of the present invention is to provide an adhesive which is able to be coated over an increased period of time in a production and/or manufacturing environment without crystallizing or coagulating.

It is yet another object of the present invention to provide an adhesive which is slow drying following coating thereof.

Further, an object of the present invention is to provide an adhesive which has the ability to substantially dissolve in a solvent.

Yet another object of the present invention is to provide an adhesive which has the ability to be sufficiently viscous when mixed with a solvent.

Still yet another object of the present invention is to provide an adhesive which is non-reactive with most solvents.

A further object of the present invention is to provide an adhesive which aids in providing improved fuser life.

Another object of the present invention is to provide an adhesive which does not require baking for solidification.

In embodiments, the present invention relates to a fuser member comprising: a) a substrate; and thereover b) an amino silane adhesive coating comprising an amino silane composition and an organic phosphonium catalyst; and having thereon, c) a fluoroelastomer outer coating comprising a fluoroelastomer.

Embodiments of the present invention further include: a process for the preparation of a fuser member comprising in sequential order a substrate, an amino silane adhesive coating comprising an amino silane composition and an organic phosphonium catalyst, and an outer fluoroelastomer coating comprising a fluoroelastomer, the process comprising: a) providing a substrate; b) rotating the substrate in a horizontal position about a longitudinal axis thereof; and simultaneously c) applying at least one of an amino silane adhesive coating and an outer fluoroelastomer coating in solution form by rotating the substrate in a horizontal position about a longitudinal axis thereof and simultaneously applying the solution coating from an applicator to the substrate in a spiral pattern in a controlled amount so that substantially all the coating from the applicator adheres to the substrate.

Embodiments of the present invention further include: an image forming apparatus for forming images on a recording medium comprising: a charge-retentive surface to receive an electrostatic latent image thereon; a development component to apply toner to the charge-retentive surface to develop the electrostatic latent image to form a developed image on the charge retentive surface; a transfer component to transfer the developed image from the charge retentive surface to a copy substrate; and a fuser member for fusing toner images to a surface of the copy substrate, wherein the fuser member comprises: a) a substrate; and thereover b) an amino silane adhesive coating comprising an amino silane composition and an organo phosphonium catalyst, and having thereon, c) a fluoroelastomer outer coating comprising a fluoroelastomer.

BRIEF DESCRIPTION OF THE DRAWINGS

For a better understanding of the present invention, reference may be had to the accompanying figures.

DETAILED DESCRIPTION OF THE PRESENT INVENTION

Figure 1:
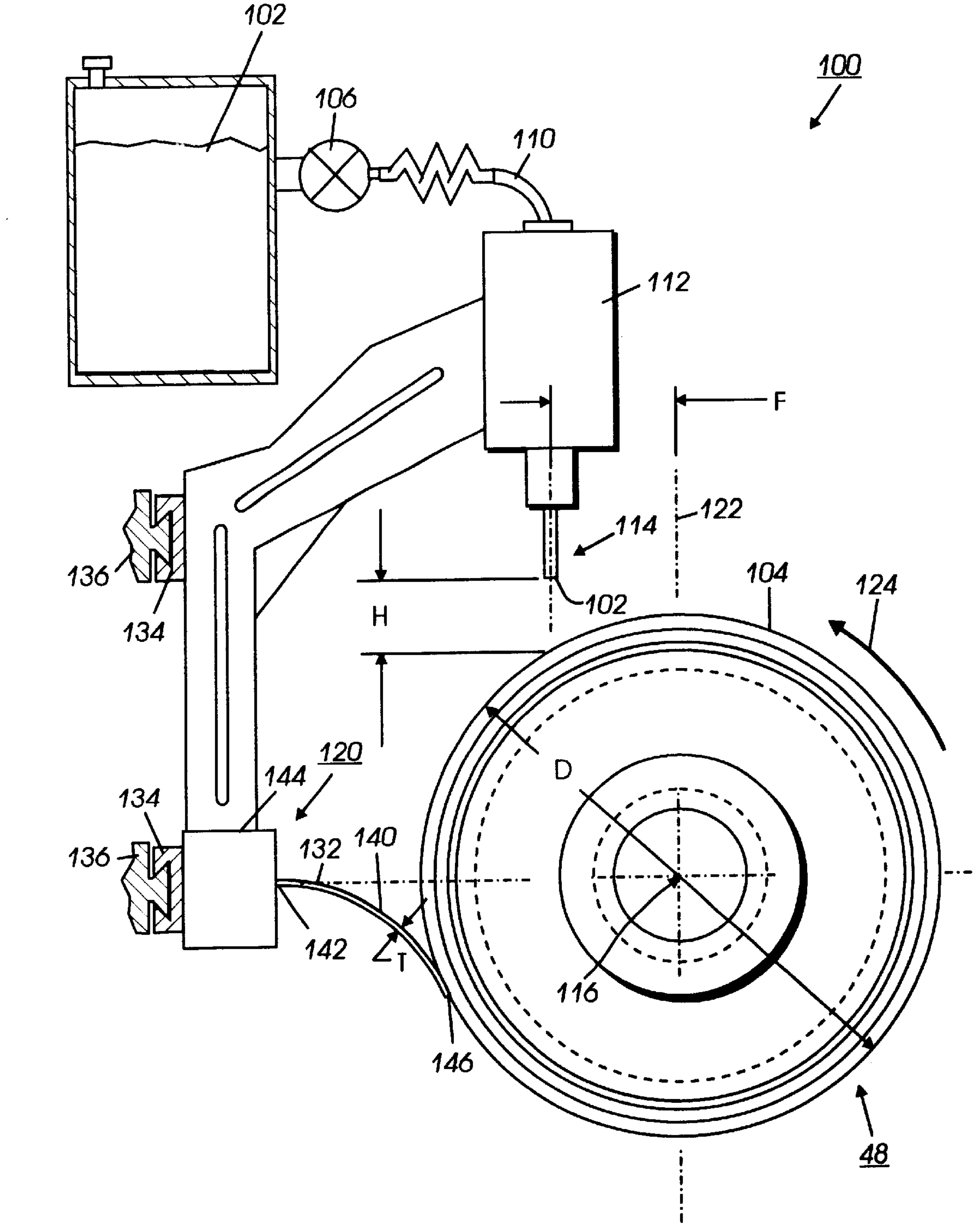
FIG. 1 is an end view of a flow coated fuser roll being prepared on a turning apparatus according to an embodiment of the present invention.

Fuser member as used herein refers to fuser members including fusing rolls, belts, films, and the like; donor members, including donor rolls, belts, films, and the like; and pressure members, including pressure rolls, belts, films, and the like; and other members useful in the fusing system of an electrostatographic or xerographic machine. It will become evident from the following discussion that the fuser member of the present invention may be employed in a wide variety of machines and is not specifically limited in its application to the particular embodiment depicted herein.

Any suitable substrate may be used as the substrate for the fuser member. The fuser member may be a roll, belt, flat surface or other suitable shape used in the fixing of thermoplastic toner images to a suitable copy substrate. It may take the form of a fuser member, a pressure member or a release agent donor member, preferably in the form of a cylindrical roll. Typically, the fuser member is made of a hollow cylindrical metal core, such as copper, aluminum, steel, or certain plastic materials chosen to maintain rigidity, structural integrity, as well as being capable of having a fluoroelastomer coated thereon and adhered firmly thereto. It is preferred that the supporting substrate is a cylindrical sleeve having an outer layer of from about 1 to about 6 mm. In one embodiment, the core which may be a steel cylinder is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes.

The adhesive solution of the present invention preferably is one which dissolves substantially in a solvent and stays dissolved in solvent for the period required for preparation of the fuser member, and in a preferred embodiment, stays dissolved in solvent for the period required for flow coating which can be up to about 8 hours, and in a manufacturing environment, up to several days, for example, about 1 to 5 days. Also, suitable adhesives for the present invention have the property that they do not react with the solvent or crystallize upon addition of a solvent. Moreover, it is preferred that the adhesive solidify in air so as not to require an extra baking and drying step in the flow coating process. It is also necessary that the adhesive adequately perform its function of adhering the outer fusing coating to the inner substrate and provide an even coating so as to help provide increased fuser life upon use.

Adhesives suitable for use herein and satisfying at least some, if not all, of the above criteria include amino silane compositions comprising compounds having the following Formula I:

$$R_1—Si—(R_2)_3 \qquad \text{Formula I}$$

wherein $R_1$ is selected from the group consisting of an amino group such as $NH_2$; an aminoalkyl of from about 1 to about 10 carbon atoms, preferably from about 2 to about 5 carbon atoms, such as aminomethyl, aminoethyl, aminopropyl, aminobutyl, and the like; an alkene of from about 2 to about 10 carbon atoms, preferably from about 2 to about 5 carbon atoms, such as ethylene, propylene, butylene, and the like; and an alkyne of from about 2 to about 10 carbon atoms, preferably from about 2 to about 5 carbon atoms, such as ethyne, propyne, butyne and the like; and wherein $R_2$ is an alkoxy group of from about 1 to about 10 atoms, preferably from about 2 to about 5 carbon atoms, such as methoxy, ethoxy, propoxy, and the like. In a preferred embodiment, in the amino silane compound of Formula I, $R_1$ is selected from the group consisting of aminomethyl, aminoethyl, aminopropyl, ethylene, ethyne, propylene and propyne, and $R_2$ is selected from the group consisting of methoxy, ethoxy, and propoxy.

In an even more preferred embodiment of the invention, the amino silane composition comprises a compound selected from the group consisting of a compound having the following Formula II:

$$R_3—Si—(R_4)_3 \qquad \text{Formula II:}$$

wherein $R_3$ is an amino group such as $NH_2$ or an aminoalkyl of from about 1 to about 10 carbon atoms such as aminomethyl, aminoethyl, aminopropyl, aminobutyl, and the like, and wherein $R_4$ is an alkoxy group of from about 1 to about 10 atoms such as methoxy, ethoxy, propoxy, and the like; a compound selected from the following Formula III:

$$R_5—Si—(R_6)_3 \qquad \text{Formula III:}$$

wherein $R_5$ is selected from the group consisting of an alkene of from about 2 to about 10 carbon atoms such as ethylene, propylene, butylene, and the like, and an alkyne of from about 2 to about 10 carbon atoms such as ethyne, propyne, butyne and the like, and wherein $R_6$ is an alkoxy group of from about 1 to about 10 atoms such as methoxy, ethoxy, propoxy, and the like; and combinations of compounds of Formula II and Formula III.

Amino silane compositions used in adhesion applications typically contain alkoxy and other functional groups such as vinyls, aryl or alkyl amino groups. In a preferred embodiment, the adhesive amino silane composition further comprises an organic phosphonium catalyst in addition to the amino silane compound(s). A preferred organic phosphonium catalyst is of the following Formula IV:

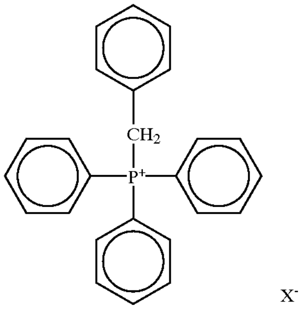

wherein X is a halogen selected from the group consisting of chlorine, fluorine, bromine, and iodine. In an even more preferred embodiment, X is chlorine.

Examples of amino silane compositions include aminopropyl triethoxy silane, aminoethyl triethoxy silane, aminopropyl trimethoxy silane, aminoethyl trimethoxy silane, ethylene trimethoxy silane, ethylene triethoxy silane, ethyne trimethoxy silane, ethyne triethoxy silane, and combinations thereof. In preferred embodiments, the amino silane compositions further comprise a benzyltriphenylphosphonium catalyst such as benzyltriphenylphosphonium chloride. A specifically preferred adhesive coating comprises an amino silane adhesive composition comprising 1 -propamine 3-(triethoxy)silane, ethynyltriethoxy silane, and benzyltriphenylphosphonium chloride (also written as 1-propamine, 3-(triethoxysilyl)silane, ethynyltriethoxy, benzyltriphenylphosphonium chloride). In this application, the requirements of coating, stability to the solvent based overcoat, and performance in testing provide excellent results by use of the above adhesive compositions. Particularly effective commercially available materials include CHEMLOCK® 5150 (1 -propamine, 3-(triethoxysilyl) silane, ethynyltriethoxy, benzyltriphenylphosphonium chloride) available from Lord Elastomer Products.

It is desirable that the adhesive possess suitable properties to allow for flow coating thereof. For example, it is desirable that the adhesive be flowable and sufficiently viscous in order to remain on the substrate without dripping off during flow coating. Preferably, the viscosity of the adhesive is from about 0.5 to about 20 centipoise, and particularly preferred is from about 1 to about 10 centipoise. Viscosities in this range provide acceptable flowability and enable thin coatings which exhibit superior adhesion. It is also desirable for the adhesive to be slow drying in order to avoid trapping solvent in the under-layers which may cause bubble formation. In addition, it is desirable to evaporate the solvent and "cure" the adhesive in the range of from about 5 to about 60 minutes.

Examples of suitable solvents for dissolving the adhesive for coating on the fuser substrate include alcohols such as methanol, ethanol and isopropanol with the preferred solvent being methanol.

It is preferable that the amino silane be present in the amino silane adhesive in solution form in an amount of from about 5 to about 35, preferably from about 20 to about 30, and particularly preferred is about 28 percent by volume (V/V). Therefore, the solvent is present in an amount of from about 65 to about 95, preferably from about 80 to about 70, and particularly preferred is about 72 percent by volume. Total volume as used herein refers to the amount of amino silane and diluent.

The adhesive layer in solution form is then applied to the fuser substrate. The adhesive layer has a thickness of from about 1 to about 10 microns, preferably from about 2 to about 4 microns.

Examples of suitable outer fusing layer of the fuser member herein include polymers such as fluoropolymers. Preferred are elastomers such as fluoroelastomers. Specifically, suitable fluoroelastomers are those described in detail in U.S. Pat. Nos. 5,166,031; 5,281,506; 5,366,772; 5,370,931; 4,257,699; 5,017,432; and 5,061,965, the disclosures each of which are incorporated by reference herein in their entirety. As described therein these fluoroelastomers, particularly from the class of copolymers, terpolymers, and tetrapolymers of vinylidenefluoride, hexafluoropropylene and tetrafluoroethylene and a possible cure site monomer, are known commercially under various designations as VITON A®, VITON E®, VITON E60C®, VITON E430®, VITON 910®, VITON GH® and VITON GF®. The VITON® designation is a Trademark of E. I. DuPont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the TECNOFLONS® identified as FOR-60KIR®, FOR-LHF®, NMW® FOR-THF®, FOR-TFS®, TH®, TN505® available from Montedison Specialty Chemical Company. In another preferred embodiment, the fluoroelastomer is one having a relatively low quantity of vinylidenefluoride, such as in VITON GF®, available from E. I. DuPont de Nemours, Inc. The VITON GF® has 35 mole percent of vinylidenefluoride, 34 mole percent of hexafluoropropylene and 29 mole percent of tetrafluoroethylene with 2 percent cure site monomer. The cure site monomer can be those available from DuPont such as 4-bromoperfluorobutene-1, 1,1-dihydro-4-bromoperfluorobutene-1, 3-bromoperfluoropropene-1, 1,1

-dihydro-3-bromoperfluoropropene-1, or any other suitable, known, commercially available cure site monomer.

Examples of fluoroelastomers suitable for use herein for the outer layer of the fuser member of the present invention include fluoroelastomers of the above type, along with hydrofluoroelastomers including volume grafted elastomers. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. Examples of specific volume graft elastomers are disclosed in U.S. Pat. Nos. 5,166,031; 5,281,506; 5,366,772; and 5,370,931, the disclosures each of which are herein incorporated by reference in their entirety.

Volume graft, in embodiments, refers to a substantially uniform integral interpenetrating network of a hybrid composition, wherein both the structure and the composition of the fluoroelastomer and polyorganosiloxane are substantially uniform when taken through different slices of the fuser member. A volume grafted elastomer is a hybrid composition of fluoroelastomer and polyorganosiloxane formed by dehydrofluorination of fluoroelastbmer by nucleophilic dehydrofluorinating agent followed by addition polymerization by the addition of alkene or alkyne functionally terminated polyorganosiloxane.

Interpenetrating network, in embodiments, refers to the addition polymerization matrix where the fluoroelastomer and polyorganosiloxane polymer strands are intertwined in one another.

Hybrid composition, in embodiments, refers to a volume grafted composition which is comprised of fluoroelastomer and polyorganosiloxane blocks randomly arranged.

Generally, the volume grafting according to the present invention is performed in two steps, the first involves the dehydrofluorination of the fluoroelastomer preferably using an amine. During this step, hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer. In embodiments, copper oxide can be added to a solution containing the graft copolymer. The dispersion is then provided onto the fuser member or conductive film surface.

In embodiments, the polyorganosiloxane having functionality can be represented by the formula:

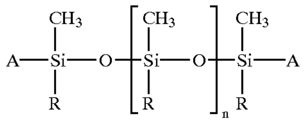

where R is an alkyl with, for example, from about 1 to about 24 carbons, or an alkenyl with, for example, from about 2 to about 24 carbons, or a substituted or unsubstituted aryl with, for example, from about 4 to about 18 carbons; A is an aryl with, for example, from about 6 to about 24 carbons, a substituted or unsubstituted alkene with, for example, from about 2 to about 8 carbons, or a substituted or unsubstituted alkyne with, for example, from about 2 to about 8 carbons; and n represents the number of segments and is, for example, from about 2 to about 400, and preferably from about 10 to about 200 in embodiments.

In preferred embodiments, R is an alkyl, alkenyl or aryl, wherein alkyl contains from about 1 to about 24 carbons, preferably from about 1 to about 12 carbons; alkenyl contains from about 2 to about 24 carbons, preferably from about 2 to about 12 carbons; and aryl contains from about 6 to about 24 carbon atoms, preferably from about 6 to about 18 carbons. R may be a substituted aryl group, wherein the aryl may be substituted with an amino, hydroxy, mercapto or substituted with an alkyl having for example from about 1 to about 24 carbons and preferably from 1 to about 12 carbons, or substituted with an alkenyl having for example from about 2 to about 24 carbons and preferably from about 2 to about 12 carbons. In a preferred embodiment, R is independently selected from methyl, ethyl, and phenyl. The functional group A can be an alkene or alkyne group having from about 2 to about 8 carbon atoms, preferably from about 2 to about 4 carbons, optionally substituted with an alkyl having for example from about 1 to about 12 carbons, and preferably from about 1 to about 12 carbons, or an aryl group having for example from about 6 to about 24 carbons, and preferably from about 6 to about 18 carbons. Functional group A can also be mono-, di-, or trialkoxysilane having from about 1 to about 10 and preferably from about 1 to about 6 carbons in each alkoxy group, hydroxy, or halogen. Preferred alkoxy groups include methoxy, ethoxy, and the like. Preferred halogens include chlorine, bromine and fluorine. A may also be an alkyne of from about 2 to about 8 carbons, optionally substituted with an alkyl of from about 1 to about 24 carbons or aryl of from about 6 to about 24 carbons. The group n is a number, for example, of from about 2 to about 400, and in embodiments from about 2 to about 350, and preferably from about 5 to about 100. Furthermore, in a preferred embodiment n is from about 60 to about 80 to provide a sufficient number of reactive groups to graft onto the fluoroelastomer. In the above formula, typical R groups include methyl, ethyl, propyl, octyl, vinyl, allylic crotnyl, phenyl, naphthyl and phenanthryl, and typical substituted aryl groups are substituted in the ortho, meta and para positions with lower alkyl groups having from about 1 to about 15 carbon atoms. Typical alkene and alkenyl functional groups include vinyl, acrylic, crotonic and acetenyl which may typically be substituted with methyl, propyl, butyl, benzyl, tolyl groups, and the like.

The amount of fluoroelastomer used to provide the outer layer of the fuser member of the present invention is dependent on the amount necessary to form the desired thickness of the layer or layers of fuser member. It is preferred that the outer fusing layer be coated to a thickness of from about 6 to about 12 mils, preferably from about 7 to about 10 mils. Specifically, the fluoroelastomer for the outer layer is added in an amount of from about 60 to about 99 percent, preferably about 70 to about 99 percent by weight of total solids. Total solids as used herein in reference to the outer fluoroelastomer layer refers to the total amount of fluoroelastomer, dehydrofluorinating agent, solvent, adjuvants, fillers and conductive fillers.

Conductive fillers may be dispersed in the outer fusing layer of the fuser member of the present invention. In a preferred embodiment a metal oxide or carbon black is dispersed in the outer fluoroelastomer surface. A preferred metal oxide is one which is capable of interacting with the functional groups of the polymeric release agent to form a thermally stable film which releases the thermoplastic resin toner and prevents the toner from contacting the elastomer material itself. In addition, it is preferred that the metal oxide be substantially non-reactive with the elastomer so that no substantial dehydrofluorination of the vinylidenefluoride in the polymer may take place. A preferred metal oxide is cupric oxide, which has been found to be a weak base and softens rather than hardens the elastomer with time thereby maintaining good copy quality. Another preferred metal oxide is aluminum oxide. In a particularly preferred embodiment, the metal oxide is a combination of cupric oxide and aluminum oxide. The metal oxide is typically present in an amount of from about 5 to 30 parts by weight per hundred parts of the polymer although it is preferred to have from about 10 to 20 parts by weight. In addition, the particle size of the metal oxide should not be so small as to interfere with the curing of the polymer nor so large as to supply an insufficient number of particles disbursed throughout the elastomer surface for good release properties. Typically, the metal oxide particles have a mean diameter of from about 4 to about 8 microns, preferably about 6 microns.

Any known solvent suitable for dissolving a fluoroelastomer may be used in the present invention. Examples of suitable solvents for the present invention include methyl ethyl ketone, methyl isobutyl ketone, diethyl ketone, cyclohexanone, n-butyl acetate, amyl acetate, and the like. Specifically, the solvent is added in an amount of from about 25 to about 99 percent, preferably from about 70 to about 95 percent by weight of total solids.

The dehydrofluorinating agent which attacks the fluoroelastomer generating unsaturation is selected from basic metal oxides such as MgO, CaO, $Ca(OH)_2$ and the like, and strong nucleophilic agents such as primary, secondary and tertiary, aliphatic and aromatic amines, where the aliphatic and aromatic amines have from about 2 to about 30 carbon atoms. Also included are aliphatic and aromatic diamines and triamines having from about 2 to about 30 carbon atoms where the aromatic groups may be benzene, toluene, naphthalene, anthracene, and the like. It is generally preferred for the aromatic diamines and triamines that the aromatic group be substituted in the ortho, meta and para positions. Typical substituents include lower alkyl amino groups such as ethylamino, propylamino and butylamino, with propylamino being preferred. The particularly preferred curing agents are the nucleophilic curing agents such as VITON CURATIVE VC-50® which incorporates an accelerator (such as a quaternary phosphonium salt or salts like VC-20) and a crosslinking agent (bisphenol AF or VC-30); DIAK 1 (hexamethylenediamine carbamate) and DIAK 3 (N,N'-dicinnamylidene-1,6 hexanediamine). The dehydrofluorinating agent is added in an amount of from about 1 to about 20 weight percent, and preferably from about 2 to about 10 weight percent of total solids.

Other adjuvants and fillers may be incorporated in the elastomer in accordance with the present invention as long as they do not affect the integrity of the fluoroelastomer. Such fillers normally encountered in the compounding of elastomers include coloring agents, reinforcing fillers, and processing aids. Oxides such as copper oxides may be added in certain amounts to fuser roll coatings to provide sufficient anchoring sites for functional release oils, and thereby allow excellent toner release characteristics from such members.

Any suitable release agent may be used including polyorganosiloxane fluids, amino oils, and the like. Preferred polymeric fluid release agents are those having functional groups which interact with the metal oxide particles in the fuser member in such a manner to form an interfacial barrier at the surface of the fuser member while leaving a non-reacted low surface energy release fluid as an outer release film. Examples of suitable release agents having functional groups include those described in U.S. Pat. Nos. 4,046,795, 4,029,827, and 4,011,362. In preferred embodiments, the chemically reactive groups of the polymeric release agents are mercapto, carboxy, hydroxy, isocyanate, epoxy and amino.

The amino silane adhesive and/or outer fluoroelastomer layer of the present invention can be coated on the fuser roll substrate by any means including normal spraying, dipping and tumble spraying techniques. The amino silane or fluoroelastomer must first be diluted with a solvent for coating. However, in a preferred embodiment of the present invention, the adhesive and the outer layer are coated onto the fuser substrate by means of a new coating procedure referred to as flow coating. The flow coating procedure will now be described in detail with reference to the drawings. In FIG. 1, a fuser roll is depicted as an example of a preferred embodiment of the invention. However, the present invention is useful for coatings of fuser belts, films, and the like; donor rolls, belts, films, and the like; pressure rolls, belts, films and the like; and like fuser members.

Referring to FIG. 1, the apparatus 100 is used to apply coating solution 102 to periphery 104 of the fuser roll 48. The coating solution is pumped via pump 106 through a conduit typically in the form of a pipe 110 to an applicator 112 including nozzle 114 through which the coating solution 102 flows onto periphery 104 of the roll 48.

The coating solution 102 is applied to the periphery 104 in a spiral fashion in which the fuser roll 48 rotates about its longitudinal axis 116 while in a horizontal position, while the applicator 112 translates in a direction parallel to the longitudinal axis 116 of the fuser roll 48 along the length of the substrate in a horizontal position. The coating solution 102 is thus applied to the periphery 104 of the fuser roll 48 in a spiral fashion. The application of the coating is similar to the path of a cutting tool when turning the periphery of a shaft in a standard lathe. By accurately controlling the amount of coating solution 102 that is displaced through pump 106 and/or by controlling accurately in any manner the amount of coating solution 102 that is released at the nozzle 114 of applicator 112, substantially all the coating solution 102 that passes through the nozzle 114 adheres to the roll 48. The of coating released through the applicator per rotation in order to obtain sufficient coating depends mostly on the viscosity of the coating, the size (circumference and length) of the fuser member to be coated, the desired thickness of the layer, the rate of flow of the coating, and other like parameters. By making the correct calculations, flow coating can be achieved wherein substantially all of the coating from the applicator adheres to the surface of the fuser member. "Substantially all" as used herein means from about 80 to about 100 percent of the coating initially released from the nozzle will adhere to the fuser member. Preferably from about 95 to about 100 percent will adhere to the fuser member. In other words, preferably about 95 to about 100 percent of the solution coating of amino silane adhesive in solution, fluoroelastomer coating in solution, or both amino silane adhesive solution and fluoroelastomer solution applied to the substrate adheres to said substrate.

Using flow coating, a very fine coating may be precisely coated onto a substrate. In particular, Applicants have been successful in obtaining a coating layer of about 0.0020 inches with a tolerance range of +/−0.0001 inches. Being able to control the thickness of the coating with such precision will virtually obviate the need for grinding and other post coating operations particularly for use in fusing color images where glossy finish on images is preferred. For black and gray tone images where a flat image is preferred, however, the surface may be too smooth following flow coating. Therefore, subsequent grinding and or polishing operations may be required to obtain the preferred dull or flat finish.

Apparatus 100 may have any suitable form and consists of any equipment capable of rotating the fuser roll 48 about longitudinal axis 116 while translating the applicator 112 in a direction parallel to the longitudinal axis 116 of the fuser roll. Standard CNC (computerized numerical control) or engine lathes may be used for this purpose. Specialty equipment may also be designed which will rotate the fuser roll while translating the applicator. Specialized equipment may be advantageous to permit the proper enclosure of the apparatus 100 to contain possible volatile coating solutions and to maintain specific environmental conditions necessary for quality coatings from this process.

When applying the coating using an apparatus 100 with an applicator 112 which applies a spiral coating through the nozzle 114, the coat is applied thread-like fashion and may have peaks and valleys on the periphery 104 of the roll 48. The placement of a member in the form of guide 120 against the periphery 104 of the roll 48 as the coating solution 102 is applied to the roll, significantly improves the uniformity of the coating upon the roll 48. Preferably, the longitudinal axis 116 of the roll 48 is positioned horizontally with respect to the floor of the building in which the apparatus is housed. This configuration permits for the affects of gravity to properly distribute the coating solution 102 about the periphery 104 of the roll 48. Further details of this preferred embodiment of the present invention, wherein a blade is used at the periphery of the roll 48. In order to improve the uniformity of the coating, are provided in commonly assigned Attorney Reference D/96035, U.S. Application Ser. No. 08/669,761 filed Jun. 26, 1996, entitled, "Leveling Blade for Flow Coating Process for Manufacture of Polymeric Printer Roll and Belt Components."

Similarly, the applicator 112 is preferably positioned above the fuser roll 40 so that the stream of coating solution coming from the nozzle 114 may rest upon the periphery 104 of the roll 48. Preferably, tip 120 of nozzle 114 is spaced a distance H above the periphery 104 of the roll 48. If the tip 120 is placed too far from the periphery 104 the coating solution 102 will evaporate before it reaches the periphery. If the tip 120 is placed too closely to the periphery 104, the tip will hit the periphery 104. For a roll having a diameter D of approximately four inches, a distance H of approximately ¼ of an inch is adequate. Positioning of the applicator 112 at a position F of approximately one inch from vertical axis 122 of the roll in the direction of rotation 124 of the roll is sufficient. The dynamics of the rotation of the roll and its position on the periphery of the roll assist in the uniform distribution of the solution 102 on the periphery of the roll.

Figure 2:
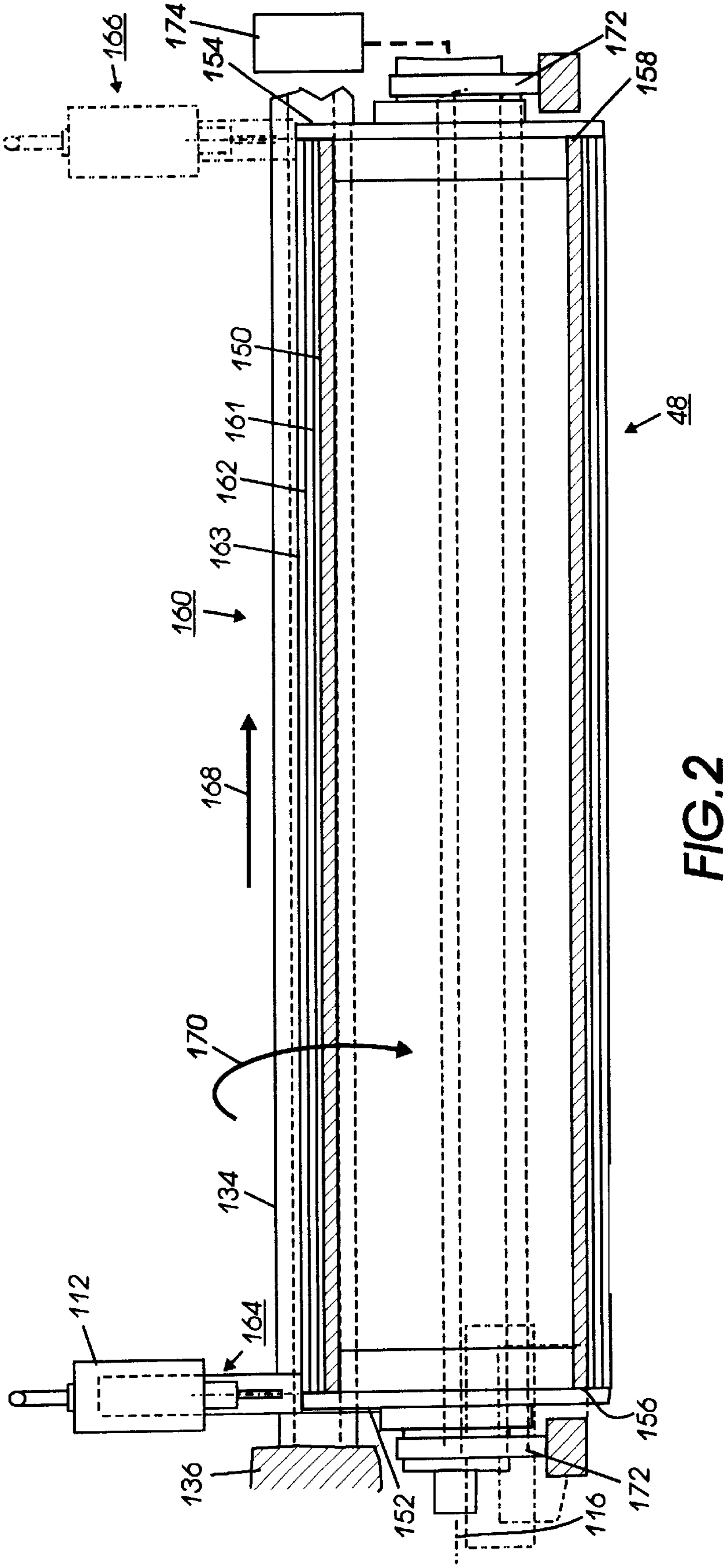
FIG. 2 is a sectional view along the line 4—4 in the direction of the arrows of the FIG. 1 fuser roll.

Referring now to FIG. 2, the fuser roll 48 and the apparatus 100 are shown in greater detail. The fuser roll 48 may be made of any suitable durable material which has satisfactory heat transfer characteristics. For example, as shown in FIG. 2, the fuser roll 48 includes a substrate in the form of a core 150 having a generally tubular shape and made of a thermally conductive material, for example, aluminum or a polymer. To provide for the driving of the roll, the roll 48 typically includes first end cap 152 and second end cap 154 located at first end 156 and second end 158 of the core 150, respectively.

The operation of the apparatus as shown in FIG. 2 is such that the applicator 112 translates from first position 164 as shown in solid to second position 166 as shown in phantom. The applicator 112 thus travels along with the slide 134 in the direction of arrow 168. The direction of travel of the applicator 112 is parallel to longitudinal axis 116 of fuser roll 48. Concurrently with the translation of the applicator 112, the roll 48 rotates in the direction of arrow 170. The roll 48 is supported in any suitable fashion such as by feed blocks 172 and is rotated in any suitable fashion such as by driver 174 which contacts end cap 154.

The flow coating process for a fuser roll includes providing a generally cylindrical shaped substrate. The substrate is rotated about a longitudinal axis of the substrate. A fluid coating is applied to the periphery of the substrate in a spiral pattern utilizing a guide to direct the coating onto the periphery of the substrate. After the coating is fully applied, the coating is ground to a precision tolerance. To obtain optimum surface configuration, subsequent operations such as super-finishing or polishing the outer periphery may also be required.

The coating may be applied in a solution with coating additives. Such a solution with approximately from about 5 to about 30, preferably about 10 to about 20 percent solids has been found to be effective. The coating may be applied at any satisfactory rate. Applicants have found that a thickness rate of from about 0.001 to about 0.005 inches, and preferably about 0.002 inches per pass is most effective. This is the thickness which is applied along the length of the roll during the roll's rotation. This amount is the amount that allows for substantially all of the coating applied to remain on the roll without dripping off or clumping up. It is preferred that the solution be applied at a rate of 30 to about 100 rotations per minute, and preferably from about 60 to about 80 rotations per minute.

The specific relative humidity is important for improving the commercial yield and quality of the rolls. Specifically, good results are obtained when the relative humidity is from about 30 to about 70% and preferably from about 50 to about 60%.

When using the flow coating process to produce belts or films, the belts or films are preferably mounted on a cylindrical mandrill and processed in a manner process similar to that heretofore described, with the outer surface of the belt being coated.

Figure 3:
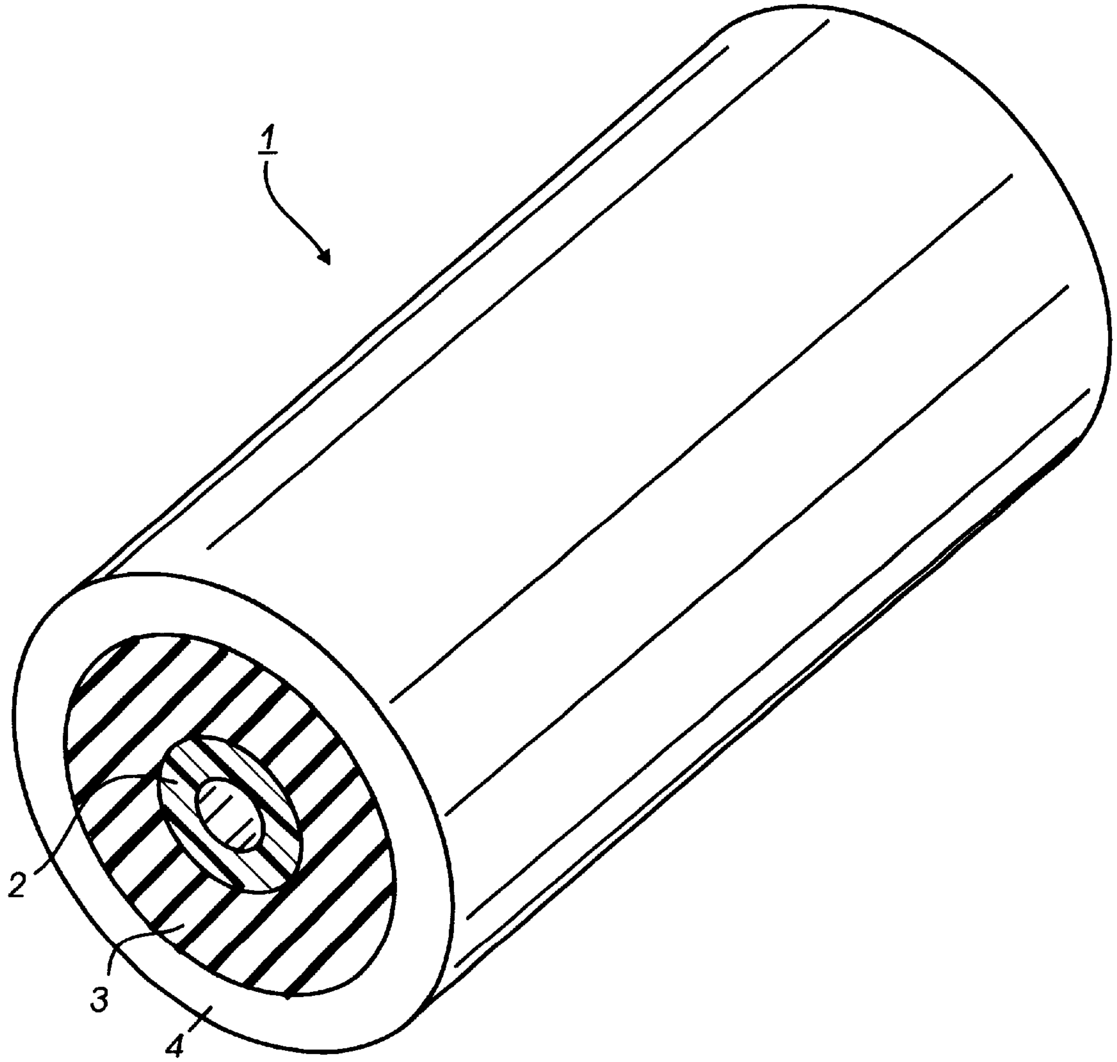
FIG. 3 is an enlarged view of a fuser roll demonstrating an embodiment of the present invention.

Referring to FIG. 3, an embodiment of the present invention is depicted, wherein the fuser roll 1 prepared by a flow coating process comprises a substrate 2 and thereover an adhesive layer 3 and an fusing layer 4. In a preferred embodiment of the present invention, the substrate is a hollow cylindrical metal core. The adhesive layer 3 is preferably an amino silane adhesive layer and the outer layer 4 is preferably a fluoroelastomer layer.

The fuser member herein comprises an amino silane adhesive which has the desired properties which enable the adhesive to be flow coated. Specifically, the amino silane adhesive is sufficiently viscous and flowable allowing for it to stay on the fuser substrate without dripping off during flow coating. The adhesive is slow to dry which prevents bubble formation. Also, the adhesive does not require baking for solidification. Further, the amino silane adhesive is dissolvable in a solvent and has the ability to stay dissolved during the flow coating process. In addition, the amino silane adhesive provides an even flow and does not react adversely with the fluoroelastomer outer layer, thereby preventing inconsistencies in the outer coating layer. Moreover, the adhesive layer provides superior adhesion between the fuser substrate an the outer fluoroelastomer layer, thereby increasing fuser life.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

Adhesive/Primer Coating

A flow coating apparatus as described in U.S. application Ser. No. 08/672,493 filed Jun. 26, 1996, entitled, "Flow Coating Process for Manufacture of Polymeric Printer Roll and Belt Components," was used to flow coat a series of aluminum fuser rolls. A modified metal turning lathe was used to support and turn the fuser roll during the coating process. CHEMLOCK® 5150 was metered on the roll through a metal nozzle at a flow rate of from about 1 to about 3 cc per minute, with the preferred flow rate being about 1.5 cc per minute. The fluid delivery nozzle was coupled by means of a bracket to a lathe traverse screw mechanism to uniformly track axially to the horizontally mounted turning roll. These application rates were obtained by using a conventional low flow rate metering pump. A follower brush "leveled" the primer solution. The follower brush was also attached by means of a bracket to the lathe traverse screw. The brush was located about 90° from the point where the liquid stream is applied to the roll, but other orientations from 10 to about 120° were also found to work. The preferred method was to have the roll turning toward the operator (front). The rotations per minute (RPM) of the roll were varied to from about 30 to about 100 RPMs, and the optimal RPM was 60. The relative humidity (RH) was 30 to 70%, with the preferred RH of about 60. The room temperature was varied from about 60 to about 800° F. with the preferred being about 680° F.

Example 2

Elastomer Coating

The same apparatus as used in Example I was used to flow coat an elastomer coating onto the adhesive coating of Example I. A modified metal turning lathe was used to support and turn the fuser roll during the coating process. A VITON® GF (28 weight percent)/methly ethyl ketone (72 weight percent) elastomer solution was metered on the roll through a metal nozzle at from about 20 to about 40 cc per minute, with the preferred flow rate being about 30 cc per minute. The fluid delivery nozzle was coupled by means of a bracket to the lathe traverse screw mechanism to uniformly track axially to the horizontally mounted, turning roll. These application rates were obtained by using a conventional metering pump. A hard metal, thin blade "leveled" the coating solution. The metal blade was also attached by means of a bracket to the lathe traverse mechanism and was located about 90° from the point where the liquid stream is applied to the roll. Other orientations of from about 10 to about 120° were also found to work. The preferred method was to have the roll turning toward the operator (front). The RPM of the roll was varied to from about 30 to 80 RPM's, with the optimal RPM being 60. The atmospheric conditions included a relative humidity of from about 30 to about 70% with the preferred RH of about 50%. The room temperature was varied from 60 to 800° F. with the preferred being about 680° F.

Example 3

Testing of Rolls

Several tensile type pull tests were used to evaluate the different primer/adhesive candidates to predict a catastrophic adhesion failure. Also, to further evaluate elastomer and adhesive roll performance, rolls were produced in accordance with the procedures outlined in Examples 1 and 2 above, and were evaluated to determine performance in actual machine conditions. The testing of the fuser rolls included testing the rolls prepared with the layers in accordance with the procedures outlined in Examples 1 and 2 above, against a population of control rolls which were prepared using spray coated epoxy based (THIXON®) primer/adhesives, and spray coated VITON® GF elastomer outer surfaces. The rolls were run with a variety of dry inks, release agents and customer originals. In all, approximately 300 rolls were tested and evaluated. Roll tracking forms were used to monitor roll performance and copy count was routinely analyzed. Roll adhesion mean life was compared across the various material/process variants. Weibull statistics were used to generate the characteristic life and mean life data. The adhesive/primer material and flow coating processes in accordance with the present invention were found to unexpectedly increase the copy count from failure at 1.7 million copies with the epoxy based adhesive solution, to failure at 2.7 million copies with the CHEMLOCK® 5150 adhesive solution. This superior improvement was calculated to be a 30% increase in copy count life over the previously used adhesive/primer material and flow coating process.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A fuser member comprising: a) a substrate; and thereover b) an amino silane adhesive coating comprising an amino silane composition and an organic phosphonium catalyst; and having thereon, c) a fluoroelastomer outer coating comprising a fluoroelastomer selected from the group consisting of a) terpolymers of vinylidenefluoride, hexafluoropropylene and tetrafluoroethylene, and b) tetrapolymers of vinylidenfluoride, hexafluoropropylene, tetrafluoroethylene and a cure site monomer.

2. A fuser member in accordance with claim 1, wherein said amino silane composition comprises a compound having the following Formula I:

$$R_1—Si—(R_2)_3 \qquad \text{Formula I}$$

wherein $R_1$ is selected from the group consisting of $NH_2$, an aminoalkyl of from about 1 to about 10 carbon atoms, an alkene of from about 2 to about 10 carbon atoms, and an alkyne of from about 2 to about 10 carbon atoms, and wherein $R_2$ is an alkoxy group of from about 1 to about 10 atoms.

3. A fuser member in accordance with claim 2, wherein $R_1$ is selected from the group consisting of aminomethyl, aminoethyl, aminopropyl, ethylene, ethyne, propylene and propyne, and wherein $R_2$ is selected from the group consisting of methoxy, ethoxy and propoxy.

4. A fuser member in accordance with claim 1, wherein said amino silane composition comprises a compound selected from the group consisting of a compound having the following Formula II:

$$R_3—Si—(R_4)_3 \qquad \text{Formula II:}$$

wherein $R_3$ is selected from the group consisting of $NH_2$ and an aminoalkyl of from about 1 to about 10 carbon atoms, and wherein $R_4$ is an alkoxy group of from about 1 to about 10 atoms; a compound having the following Formula III:

$R_5—Si—(R_6)_3$ Formula III:

wherein $R_5$ is selected from the group consisting of an alkene of from about 2 to about 10 carbon atoms and an alkyne of from about 2 to about 10 carbon atoms, and wherein $R_6$ is an alkoxy group of from about 1 to about 10 atoms; and combinations of compounds of Formula II and Formula III.

5. A fuser member in accordance with claim 1, wherein said organic phosphonium catalyst is of the following Formula IV:

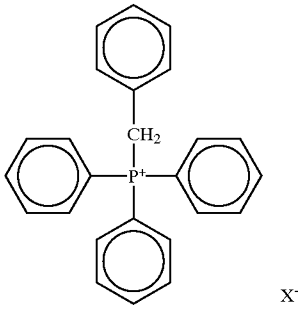

wherein X is selected from the group consisting of chlorine, fluorine, bromine, and iodine.

6. A fuser member in accordance with claim 1, wherein said amino silane composition comprises 1-propamine 3-(triethoxy)silane, ethynyltriethoxy silane, and benzyltriphenylphosphonium chloride.

7. A fuser member in accordance with claim 1, wherein said fluoroelastomer comprises 35 mole percent of vinylidenefluoride, 34 mole percent of hexafluoropropylene, 29 mole percent of tetrafluoroethylene and 2 mole percent of a cure site monomer.

8. A fuser member in accordance with claim 1, wherein said fluoroelastomer outer coating further comprises a metal oxide filler.

9. A fuser member in accordance with claim 8, wherein said metal oxide filler is selected from the group consisting of aluminum oxide, cupric oxide and mixtures thereof.

10. A fuser member in accordance with claim 1, wherein at least one of said amino silane adhesive coating and said outer fluoroelastomer coating is applied to the substrate in solution form by spray coating said at least one coating in solution form to said substrate.

11. A fuser member in accordance with claim 1, wherein at least one of said amino silane adhesive coating and said outer fluoroelastomer coating is applied to the substrate in a solution form by rotating the substrate in a horizontal position about a longitudinal axis thereof and simultaneously applying the solution coating from an applicator to the substrate in a spiral pattern in a controlled amount so that substantially all the coating from the applicator adheres to said substrate.

12. A fuser member in accordance with claim 11, wherein said amino silane coating solution comprises a methanol solvent.

13. A fuser member in accordance with claim 1, wherein said amino silane coating solution has a viscosity of from about 1 to about 10 centipoise.

14. A fuser member in accordance with claim 11, wherein said at least one of said amino silane adhesive coating and said outer fluoroelastomer coating is applied to the substrate at a rate of from about 30 to about 100 rotations per minute.

15. A fuser member in accordance with claim 12, wherein at least one of said amino silane coating solution and said fluoroelastomer coating solution is applied at a relative humidity of from about 30 to about 70%.

16. A fuser member in accordance with claim 15, wherein the relative humidity is about 60%.

17. A fuser member in accordance with claim 11, wherein from about 95 to about 100 percent of at least one of said amino silane coating solution and said fluoroelastomer coating solution applied to said substrate adheres to said substrate.

18. A process for the preparation of a fuser member comprising in sequential order a substrate, an amino silane adhesive coating comprising an amino silane composition and an organic phosphonium catalyst, and an outer fluoroelastomer coating comprising a fluoroelastomer, said process comprising:

a) providing a substrate;

b) rotating the substrate in a horizontal position about a longitudinal axis thereof; and simultaneously c) applying at least one of an amino silane adhesive coating and an outer fluoroelastomer coating in solution form by rotating the substrate in a horizontal position about a longitudinal axis thereof and simultaneously applying the solution coating from an applicator to the substrate in a spiral pattern in a controlled amount so that substantially all the coating from the applicator adheres to said substrate.

19. A process in accordance with claim 18, wherein said amino silane composition comprises a compound having the following Formula I:

$R_1—Si—(R_2)_3$ Formula I wherein $R_1$ is selected from the group consisting of $NH_2$, an aminoalkyl of from about 1 to about 10 carbon atoms, an alkene of from about 2 to about 10 carbon atoms, and an alkyne of from about 2 to about 10 carbon atoms, and wherein $R_2$ is an alkoxy group of from about 1 to about 10 atoms.

20. A process in accordance with claim 19, wherein $R_1$ is selected from the group consisting of aminomethyl, aminoethyl, aminopropyl, ethylene, ethyne, propylene and propyne, and wherein $R_2$ is selected from the group consisting of methoxy, ethoxy and propoxy.

21. A process in accordance with claim 18, wherein said amino silane composition comprises a compound selected from the group consisting of a compound having the following formula II:

$R_3—Si—(R_4)_3$ Formula II:

wherein $R_3$ is selected from the group consisting of $NH_2$ and an aminoalkyl of from about 1 to about 10 carbon atoms, and wherein $R_4$ is an alkoxy group of from about 1 to about 10 atoms; a compound having the following Formula III:

$R_5—Si—(R_6)_3$ Formula III:

wherein $R_5$ is selected from the group consisting of an alkene of from about 2 to about 10 carbon atoms and an alkyne of from about 2 to about 10 carbon atoms, and wherein $R_6$ is an alkoxy group of from about 1 to about 10 atoms; and combinations of compounds of Formula II and Formula III.

22. A process in accordance with claim 18, wherein said organic phosphonium catalyst is of the following Formula III:

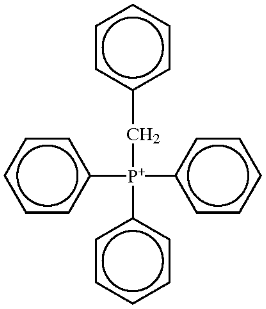

X- wherein X is selected from the group consisting of chlorine, fluorine, bromine, and iodine.

23. A process in accordance with claim 22, wherein X is chlorine.

24. A process in accordance with claim 18, wherein said amino silane composition comprises 1-propamine 3-(triethoxy)silane, ethynyltriethoxy silane, and benzyltriphenylphosphonium chloride.

25. A process in accordance with claim 18, wherein said fluoroelastomer is selected from the group consisting of a) copolymers of vinylidenefluoride, hexafluoropropylene and tetrafluoroethylene, b) terpolymers of vinylidenefluoride, hexafluoropropylene and tetrafluoroethylene, and c) tetrapolymers of vinylidenfluoride, hexafluoropropylene, tetrafluoroethylene and a cure site monomer.

26. A process in accordance with claim 25, wherein said fluoroelastomer comprises 35 mole percent of vinylidenefluoride, 34 mole percent of hexafluoropropylene, 29 mole percent of tetrafluoroethylene and 2 mole percent of a cure site monomer.

27. A process in accordance with claim 18, wherein said fluoroelastomer coating further comprises a metal oxide filler selected from the group consisting of aluminum oxide, cupric oxide and combinations thereof.

28. A process in accordance with claim 18, wherein said amino silane coating solution has a viscosity of from about 1 to about 10 centipoise.

29. A process in accordance with claim 18, wherein said at least one of said amino silane coating solution and said outer fluoroelastomer coating solution is applied to the substrate at a rate of from about 30 to about 100 rotations per minute.

30. A process in accordance with claim 18, wherein at least one of said coating solution and said fluoroelastomer solution is applied at a specific relative humidity of from about 30 to about 70%.

31. A process in accordance with claim 18, wherein from about 95 to about 100 percent of at least one of said amino silane coating solution and said fluoroelastomer coating solution applied to said substrate adheres to said substrate.

32. An image forming apparatus for forming images on a recording medium comprising:

a charge-retentive surface to receive an electrostatic latent image thereon;

a development component to apply toner to said charge-retentive surface to develop said electrostatic latent image to form a developed image on said charge retentive surface;

a transfer component to transfer the developed image from said charge retentive surface to a copy substrate; and a fuser member for fusing toner images to a surface of said copy substrate, wherein said fuser member comprises: a) a substrate; and thereover b) an amino silane adhesive coating comprising an amino silane composition and an organo phosphonium catalyst, and having thereon, c) a fluoroelastomer outer coating comprising a fluoroelastomer.

* * * * *